United States Patent
Miyaguchi et al.

(10) Patent No.: US 11,753,058 B2
(45) Date of Patent: Sep. 12, 2023

(54) MOVEMENT ASSISTING TOOL

(71) Applicant: Kubota Corporation, Osaka (JP)

(72) Inventors: Kazutomo Miyaguchi, Sakai (JP); Hirokazu Ito, Sakai (JP)

(73) Assignee: Kubota Corporation, Osaka (JP)

( * ) Notice: Subject to any disclaimer, the term of this patent is extended or adjusted under 35 U.S.C. 154(b) by 65 days.

(21) Appl. No.: 17/339,260

(22) Filed: Jun. 4, 2021

(65) Prior Publication Data

US 2022/0055673 A1 Feb. 24, 2022

(30) Foreign Application Priority Data

Aug. 18, 2020 (JP) .................................. 2020-138057

(51) Int. Cl.
*B62B 1/12* (2006.01)
*B62B 5/00* (2006.01)

(52) U.S. Cl.
CPC .............. *B62B 1/12* (2013.01); *B62B 5/0079* (2013.01)

(58) Field of Classification Search
CPC ................................. B62B 1/12; B62B 5/0079
See application file for complete search history.

(56) References Cited

U.S. PATENT DOCUMENTS

| 7,575,246 B1 * | 8/2009 | Lunski ................. B65F 1/1473 |
| | | 280/47.16 |
| 9,216,750 B2 * | 12/2015 | Sindlinger ............... B60P 3/04 |
| 10,099,710 B1 | 10/2018 | Costa et al. |

FOREIGN PATENT DOCUMENTS

| JP | 11346815 A | 12/1999 |
| JP | 201973148 A | 5/2019 |

* cited by examiner

*Primary Examiner* — Bryan A Evans
(74) *Attorney, Agent, or Firm* — THE WEBB LAW FIRM (57) ABSTRACT

A movement assisting tool (23) includes an attachment portion (24) that can be attached to and removed from a main body portion (11) of a battery unit (4), leg portions (25) that are coupled to the attachment portion (24) and extend from the attachment portion (24), and moving wheels (26) that are supported by extension portions of the leg portions (25). In a state where the attachment portion (24) has been attached to the main body portion (11) of the battery unit (4) and the moving wheels (26) are touching the ground, the battery unit (4) can be kept in an inclined orientation in which the wheels (13) are touching the ground and ground contact portions (14) are raised above the ground.

22 Claims, 10 Drawing Sheets

MOVEMENT ASSISTING TOOL

CROSS-REFERENCE TO RELATED APPLICATION

This application claims priority to Japanese Patent Application No. 2020-138057 filed Aug. 18, 2020, the disclosure of which is hereby incorporated by reference in its entirety.

BACKGROUND OF THE INVENTION

1. Field of the Invention

The present invention relates to a movement assisting tool that assists the movement of a battery unit.

2. Description of the Related Art

JP 2019-73148A discloses a battery unit for provision as a power source in an electric work vehicle.

The battery unit of JP 2019-73148A includes a main body portion for accommodating a battery, moving wheels provided in one portion of the lower portion of the main body portion, and ground contact portions provided in another portion of the lower portion of the main body portion, and is self-supported due to the wheels and the ground contact portions touching the ground.

JP 2019-73148A is an example of related art.

SUMMARY OF THE INVENTION

In a case of manually moving the battery unit of JP 2019-73148A or manually placing it on a truck bed, an operator grabs an operation handle of the battery unit, puts the battery unit in an inclined state in which the wheels touch the ground and the ground contact portions are raised above the ground, and pushes/pulls the operation handle while maintaining the inclined state. Accordingly, if the battery unit is heavy, a burden is placed on the operator.

Accordingly, it is conceivable to connect the battery unit to a work vehicle and move the battery unit by using the work vehicle to push/pull the battery unit. In this case, it is preferable that the battery unit is in a self-supporting and movable state in which the ground contact portions of the battery unit are raised above the ground.

An object of the present invention is to achieve a simple configuration for a movement assisting tool that provides assistance such that the battery unit can move in a self-supported state.

One aspect of the present invention is a movement assisting tool for attachment to a battery unit that includes a main body portion that accommodates a battery, a moving wheel provided in one portion of a lower portion of the main body portion, and a ground contact portion provided in another portion of the lower portion of the main body portion, the movement assisting tool including: an attachment portion that can be attached to and removed from the main body portion; a leg portion that is coupled to the attachment portion and extends from the attachment portion; and a moving wheel supported by an extension portion of the leg portion, wherein in a state where the attachment portion has been attached to the main body portion and the moving wheel is touching the ground, the battery unit can be kept in an inclined orientation in which the wheel is touching the ground and the ground contact portion is raised above the ground.

According to the present invention, by attaching the attachment portion of the movement assisting tool to the main body portion of the battery unit and bringing the moving wheel of the movement assisting tool and the wheel of the battery unit into contact with the ground, the operator can cause the battery unit to be self-supporting in an inclined orientation in which the wheel of the battery unit is touching the ground and the ground contact portion is raised above the ground. In this state, the battery unit can be moved using the moving wheel of the movement assisting tool and the wheel of the battery unit.

According to the present invention, the movement assisting tool can allow the battery unit to be in a self-supported state and a movable state by effectively utilizing the wheel of the battery unit in cooperation with the wheel of the battery unit. As a result, the movement assisting tool does not need to be large enough to support the entirety of the battery unit, and a simple movement assisting tool can be obtained.

In the present invention, it is preferable that the attachment portion has a predetermined length along a width direction of the main body portion, and there are two leg portions that are respectively coupled to and extend from one end portion and another end portion, with respect to a direction along the predetermined length, of the attachment portion.

According to the present invention, the pair of leg portions and moving wheels of the movement assisting tool are arranged with a relatively wide gap therebetween. This therefore improves the ability of the battery unit to be self-supporting and move stably in the state where the movement assisting tool has been attached to the battery unit and the moving wheels of the movement assisting tool and the wheels of the battery unit are touching the ground.

In the present invention, it is preferable that the predetermined length is the same as the length of the main body portion in the width direction.

According to the present invention, it is possible to achieve a state where the pair of leg portions and moving wheels of the movement assisting tool are arranged with a relatively wide gap therebetween, while also avoiding a state where the pair of leg portions and moving wheels protrude a large amount outward from the main body portion of the battery unit when the movement assisting tool is attached to the battery unit.

Accordingly, when the battery unit is moved in a state where the movement assisting tool has been attached to the battery unit, there is a low possibility that the pair of leg portions and moving wheels of the movement assisting tool will come into contact with another object and hinder the movement of the battery unit.

In the present invention, it is preferable that the movement assisting tool further includes: a frame that is coupled to and extends between the leg portions that are respectively coupled to the one end portion and the other end portion, with respect to the direction along the predetermined length, of the attachment portion.

According to the present invention, the pair of leg portions are reinforced by the frame in the state where the leg portions and moving wheels of the movement assisting tool are arranged with a relatively wide gap therebetween.

In the present invention, it is preferable that the attachment portion can be attached to and removed from the other portion of the lower portion of the main body portion.

In the state where the movement assisting tool has been attached to the battery unit, in order for the movement wheels of the movement assisting tool and the wheels of the battery unit to touch the ground such that the battery unit is self-supporting, the center of gravity of the battery unit needs to be located between the wheels of the battery unit and the moving wheels of the movement assisting tool.

With battery units, the center of gravity of the battery unit is often located near the center of the lower portion of the main body portion of the battery unit (between the wheels and the ground contact portions of the battery unit).

According to the present invention, the attachment portion of the movement assisting tool is attached to the other portion (near the ground contact portions) of the lower portion of the main body portion of the battery unit. For this reason, it is possible to reasonably realize a state in which the center of gravity of the battery unit is located between the wheels of the battery unit and the moving wheels of the movement assisting tool.

In the present invention, it is preferable that in the other portion of the lower portion of the main body portion, the attachment portion can be attached so as to span a bottom portion of the main body portion and a vertical wall portion of the main body portion that is connected to the bottom portion.

In the other portion of the lower portion of the main body portion of the battery unit, the bottom portion of the main body portion of the battery unit and the vertical wall portion of the main body portion intersect each other and face mutually different directions.

In the case where the attachment portion of the movement assisting tool is configured to be attached to the other portion (near the ground contact portions) of the lower portion of the main body portion of the battery unit, according to the present invention, the attachment portion of the movement assisting tool is attached so as to span the bottom portion and the vertical wall portion of the main body portion of the battery unit, and is attached to portions that face mutually different directions. As a result, the attachment strength of the attachment portion of the movement assisting tool can be increased.

In the present invention, it is preferable that the attachment portion includes a bottom attachment portion that can be attached to and removed from the bottom portion of the main body portion, and a vertical wall attachment portion that can be attached to and removed from the vertical wall portion of the main body portion, and the bottom attachment portion and the vertical wall attachment portion can be attached and removed in the same direction extending along the bottom portion of the main body portion or the same direction extending along the vertical wall portion of the main body portion.

In the case where the attachment portion of the movement assisting tool is attached so as to span the bottom portion and the vertical wall portion of the main body portion of the battery unit, according to the present invention, even if the bottom portion and the vertical wall portion of the main body portion of the battery unit face mutually different directions, the bottom attachment portion and the vertical wall attachment portion of the attachment portion of the movement assisting tool can be attached to (removed from) the bottom portion and the vertical wall portion of the main body portion of the battery unit in the same direction along the bottom portion of the main body portion of the battery unit or in the same direction along the vertical wall portion of the main body portion of the battery unit. This therefore improves the ability to easily attach and remove the attachment portion of the movement assisting tool.

In the present invention, it is preferable that one out of the bottom attachment portion and the vertical wall attachment portion is an opening portion formed in the attachment portion, another one out of the bottom attachment portion and the vertical wall attachment portion is a pin or a boss portion that is coupled to the attachment portion, the one out of the bottom attachment portion and the vertical wall attachment portion is attached to the main body portion by a bolt being inserted into the opening portion and screwed to the main body portion, and the other one out of the bottom attachment portion and the vertical wall attachment portion is attached to the main body portion by the pin or the boss portion being inserted into a boss portion or a pin of the main body portion.

According to the present invention, the bottom attachment portion and the vertical wall attachment portion of the attachment portion of the movement assisting tool are simply configured by an opening portion and a pin (boss portion). This configuration is thus advantageous in terms of simplification of the structure.

The opening portion and the pin (boss portion) can be easily set so as to be attached and removed in one direction. Therefore, it is possible to easily set the same direction for the attachment direction and the removal direction of the bottom attachment portion and the vertical wall attachment portion of the attachment portion of the movement assisting tool.

In the present invention, it is preferable that the moving wheel is a caster wheel that can freely change direction about an axis that extends in a vertical direction.

According to the present invention, if the moving direction of the battery unit is to be changed while the movement assisting tool is attached to the battery unit, the moving direction of the battery unit can be changed easily because the moving wheel of the movement assisting tool is a caster wheel.

DETAILED DESCRIPTION OF PREFERRED EMBODIMENTS

FIGS. 1 to 16 show an electric riding mower, which is an example of an electric work vehicle, a battery unit 4 mounted in the riding mower, and a movement assisting tool 23 of the present invention. F indicates the forward direction, B indicates the backward direction, U indicates the upward direction, D indicates the downward direction, R indicates the right direction, and L indicates the left direction.

Configuration of Riding Mower

Figure 1:
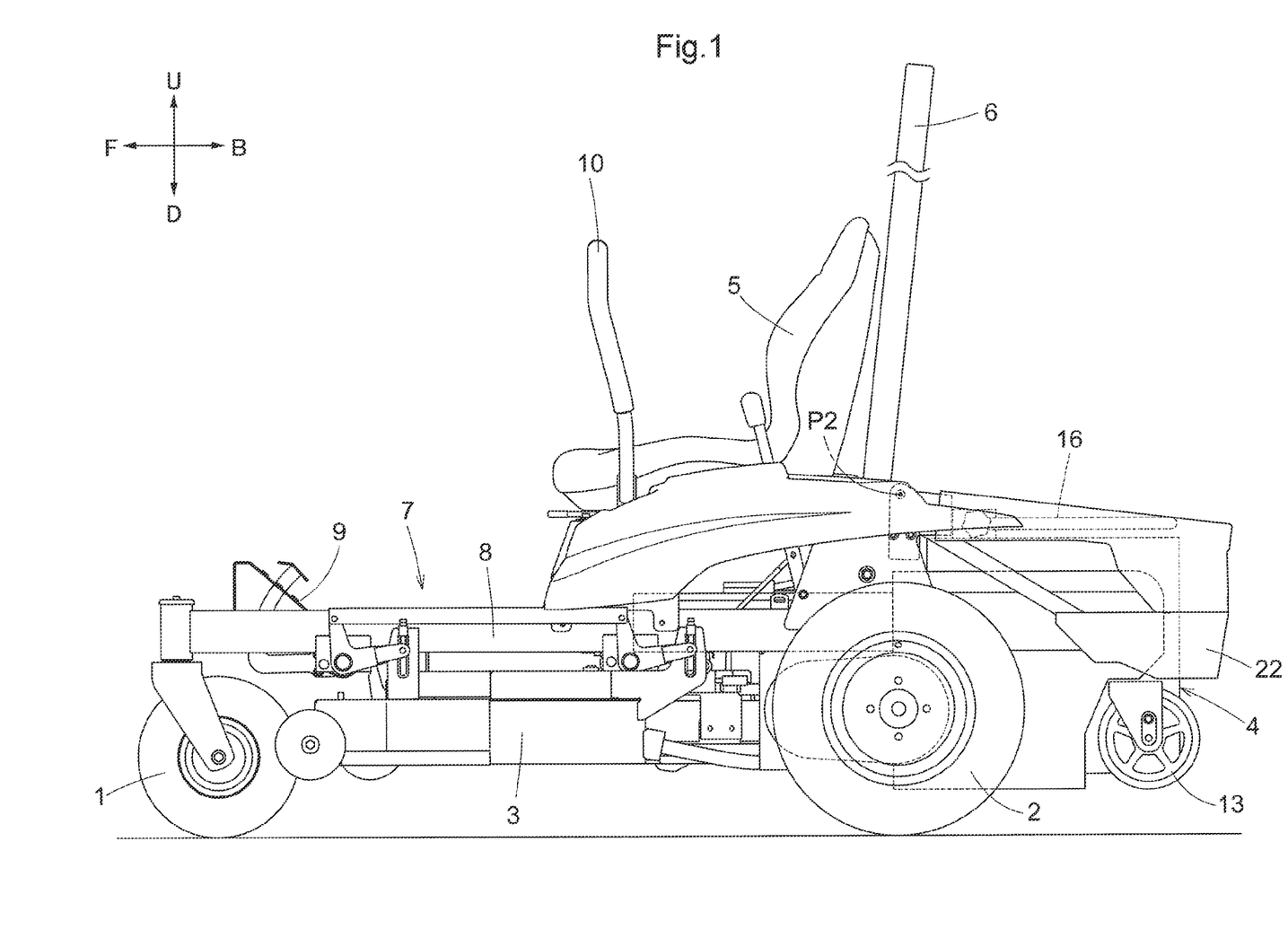
FIG. 1 is a left side view of a riding mower.
Figure 2:
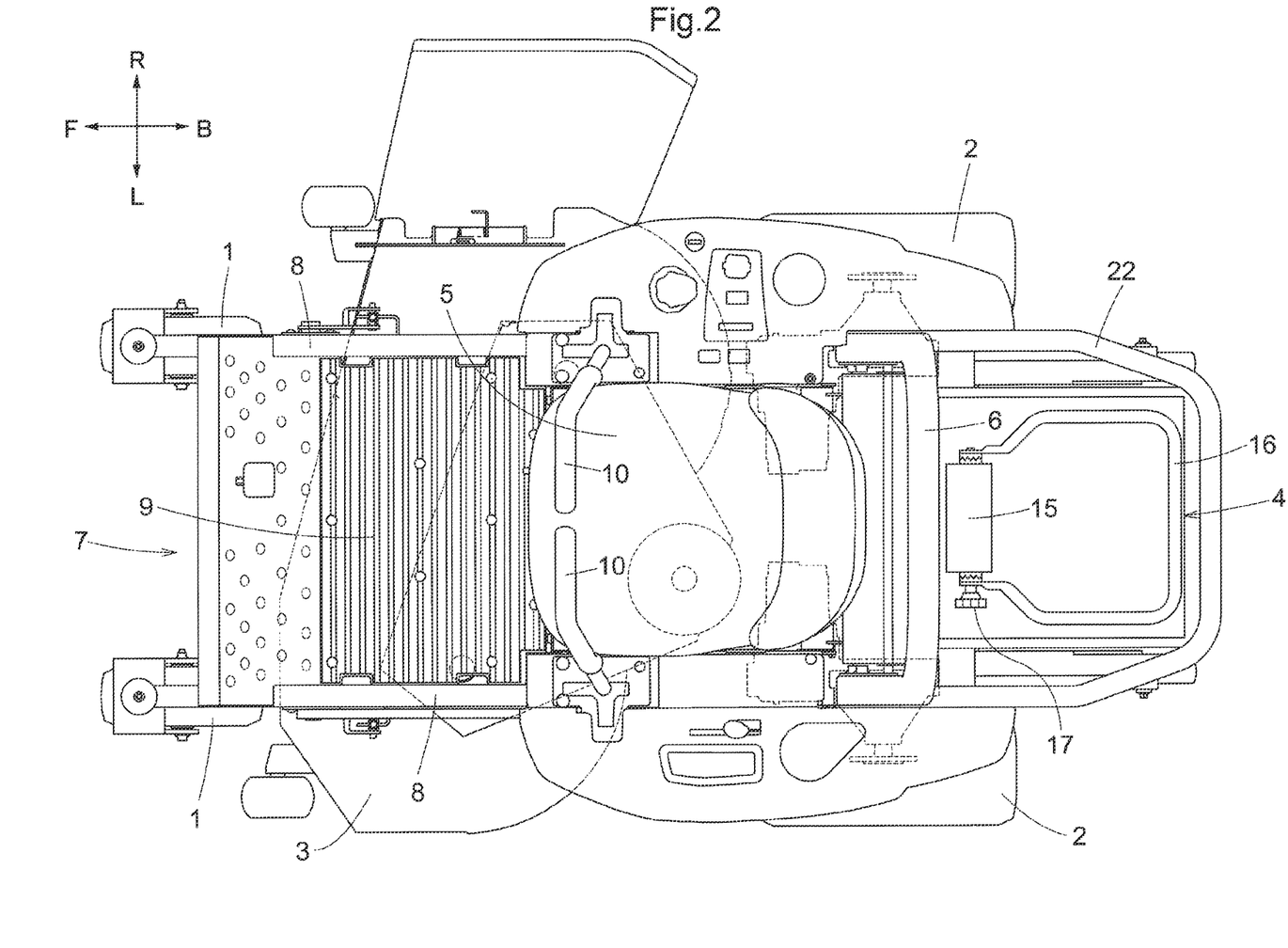
FIG. 2 is a plan view of the riding mower.

As shown in FIGS. 1 and 2, the riding mower includes right and left front wheels 1 that are supported by a front portion of a machine body 7, right and left rear wheels 2 that are supported by a rear portion of the machine body 7, a mower 3 that is supported between the front wheels 1 and the rear wheels 2 in a lower portion of the machine body 7, a battery unit 4 that is supported between the right and left rear wheels 2 in a rear portion of the machine body 7, and a driver's seat 5 and a ROPS frame 6 that is supported by an upper portion of the machine body 7.

The machine body 7 has a right and left body frames 8 that extend along the front-back direction and a floor 9 that is connected to and extends between the right and left body frames 8. The right and left front wheels 1 are caster wheels that can rotate freely, and are supported by a front end portion of the body frame 8.

A right electric motor (not shown) capable of driving the right rear wheel 2 and a left electric motor (not shown) capable of driving the left rear wheel 2 are provided. The right and left rear wheels 2 are independently driven to rotate. Right and left shift levers 10 for operating the right and left electric motors are provided. The shift levers 10 can be operated forward from a neutral position to a forward traveling side, and backward to a reverse traveling side.

When one of the shift levers 10 is moved to the neutral position, the corresponding electric motor is stopped. When the shift lever 10 is operated to the forward traveling side, the electric motor operates in the forward traveling direction. When the shift lever 10 is operated to the reverse traveling side, the electric motor operates in the reverse traveling direction. By operating the right and left shift levers 10, the right and left rear wheels 2 are driven in the forward traveling direction and the reverse traveling direction independently of each other, and thus forward and reverse traveling as well as right turning and left turning are performed.

Configuration of Battery Unit

Figure 3:
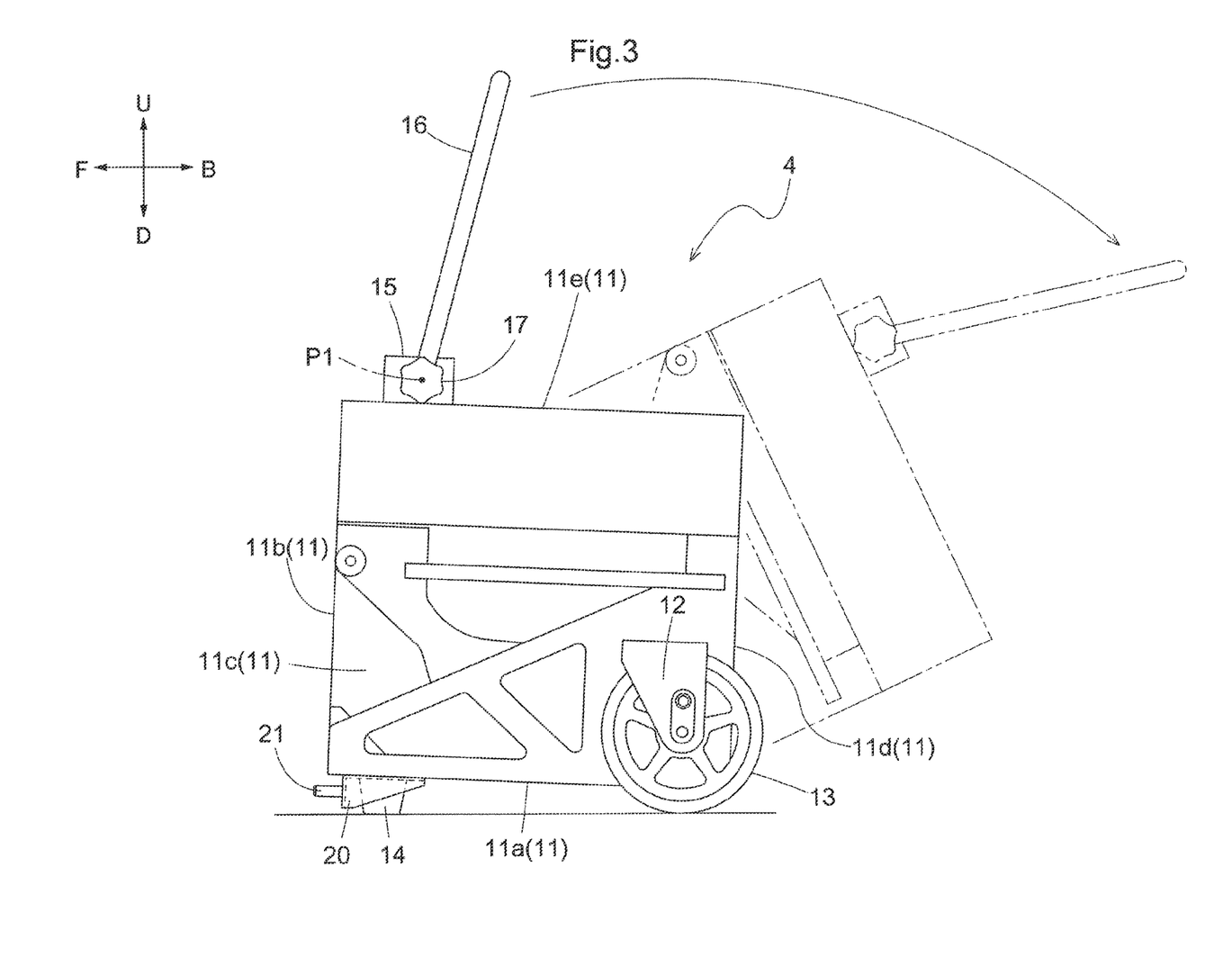
FIG. 3 is a left side view of a battery unit.
Figure 4:
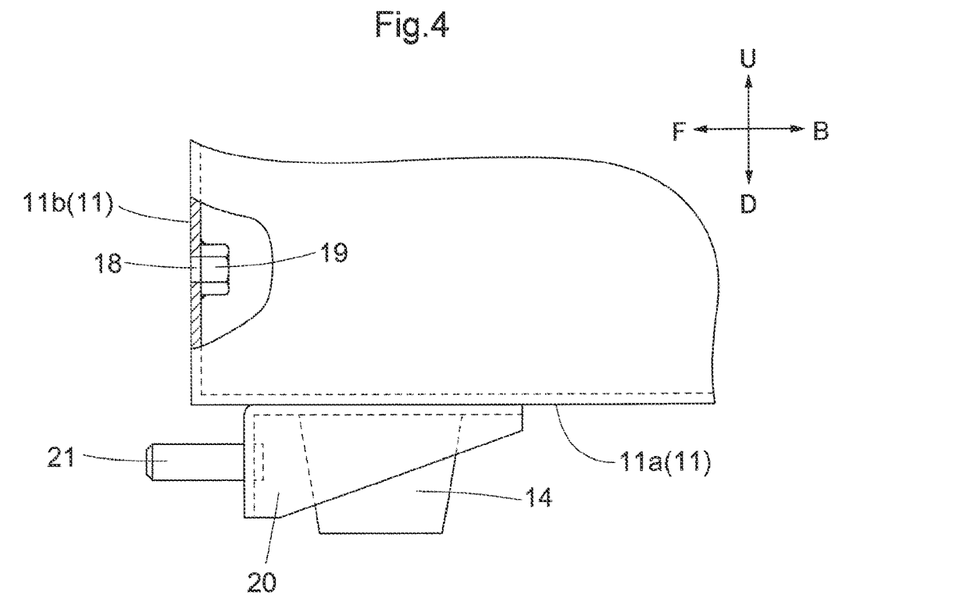
FIG. 4 is a left side view of a region including a bracket and a pin of the battery unit.
Figure 5:
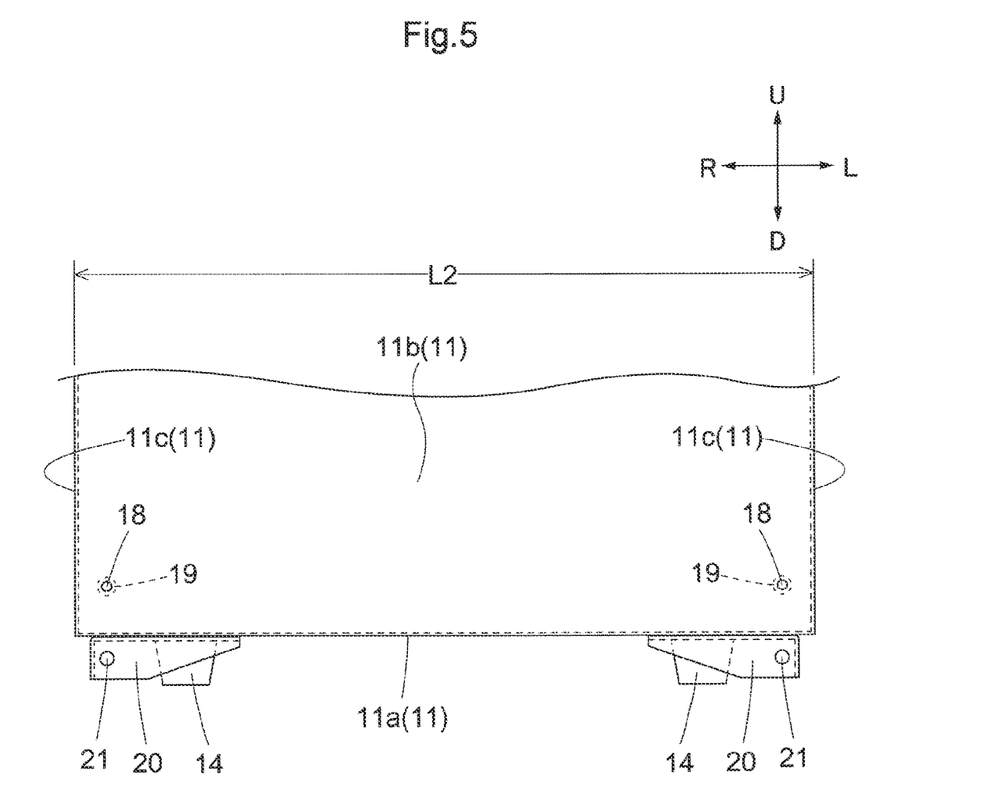
FIG. 5 is a front view of a region including the bracket and the pin of the battery unit.

As shown in FIGS. 3, 4 and 5, the battery unit 4 is overall configured by accommodating a battery (not shown) inside a main body portion 11, and the configuration will be described below in more detail.

The main body portion 11 is configured in a box shape and has a bottom portion 11a, a front wall portion 11b (corresponding to a vertical wall portion that is connected to the bottom portion 11a in the main body portion 11), right and left side wall portions 11c, a rear wall portion 11d, and a ceiling portion 11e.

Right and left brackets 12 are connected to lower portions of rear portions of the right and left side wall portions 11c of the main body portion 11. Right and left wheels 13 are supported by the brackets 12 so as to be able to freely rotate around an axis extending along the left-right direction, and are provided in a state of protruding below the bottom portion 11a of the main body portion 11 (corresponding to the state of the moving wheels 13 provided in one portion of the lower portion of the main body portion 11).

Right and left ground contact portions 14 made of hard rubber are coupled so as to protrude downward from right and left portions of a front portion of the bottom portion 11a of the main body portion 11 (corresponding to the state of the ground contact portions 14 provided in another portion of the lower portion of the main body portion 11).

A bracket 15 is coupled to a front portion of the ceiling portion He of the main body portion 11. An arch-shaped operation handle 16 is supported by the bracket 15 so as to be able to swing around an axis P1 that extends along the left-right direction. The operation handle 16 can swing up and down between an upright orientation (see FIG. 3) and a backward inclined orientation. A dial-operated fixture 17 that can fix the operation handle 16 in any orientation and also release it from the fixed orientation is provided.

As shown in FIGS. 4 and 5, right and left opening portions 18 are formed extending in the front-back direction in right and left portions of a lower portion of the front wall portion 11b of the main body portion 11. Nuts 19 are coupled to the inner surface of the front wall portion 11b of the main body portion 11.

Right and left brackets 20 are coupled protruding downward from right and left portions of a front portion of the bottom portion 11a of the main body portion 11, at locations forward of the ground contact portions 14. Right and left pins 21 are coupled protruding forward from the brackets 20.

Accordingly, the opening portions 18 and the pins 21 face the same direction A1 (see FIGS. 9 and 10) along the bottom portion 11a of the main body portion 11 of the battery unit 4.

Attachment/Removal of Battery Unit to/from Body

As shown in FIGS. 1 and 2, a cover body 22 is supported so as to be capable of swinging around an axis P2 that extends along the left-right direction of a rear portion of the machine body 7, and can swing between a closed position of covering the rear portion of the machine body 7 (see FIGS. 1 and 2) and an open position of having moving upward away from the closed position.

The cover body 22 is not provided with a portion corresponding to a ceiling (a portion that faces the upper side of the rear portion of the machine body 7). When the cover body 22 has been swung to the closed position, the upper side of the rear portion of the machine body 7 is open, and the rear side of the rear portion of the machine body 7 is covered.

The state shown in FIGS. 1 and 2 is a state in which the battery unit 4 has been attached to the rear portion of the machine body 7 and the cover body 22 has been swung to the closed position.

The operator can remove the battery unit 4 from the rear portion of the machine body 7 by swinging the cover body 22 to the open position and moving the battery unit 4 rearward from the rear portion of the machine body 7.

As shown in FIG. 3, after the battery unit 4 has been removed from the rear portion of the machine body 7, the battery unit 4 is self-supported due to the wheels 13 and the ground contact portions 14 touching the ground.

The operator can grab the operation handle 16 of the battery unit 4, put the battery unit 4 in an inclined orientation in which the wheels 13 touch the ground and the ground contact portions 14 are raised above the ground (see the state shown by dashed double-dotted lines in FIG. 3), and use the operation handle 16 to move the battery unit 4 while keeping the inclined orientation.

When the battery unit 4 is to be attached to the rear portion of the machine body 7, the operator swings the cover body 22 to the open position and moves the battery unit 4 forward into the rear portion of the machine body 7, thereby attaching the battery unit 4 to the rear portion of the machine body 7. Thereafter, the cover body 22 is swung to the closed position.

Configuration of Movement Assisting Tool

Figure 6:
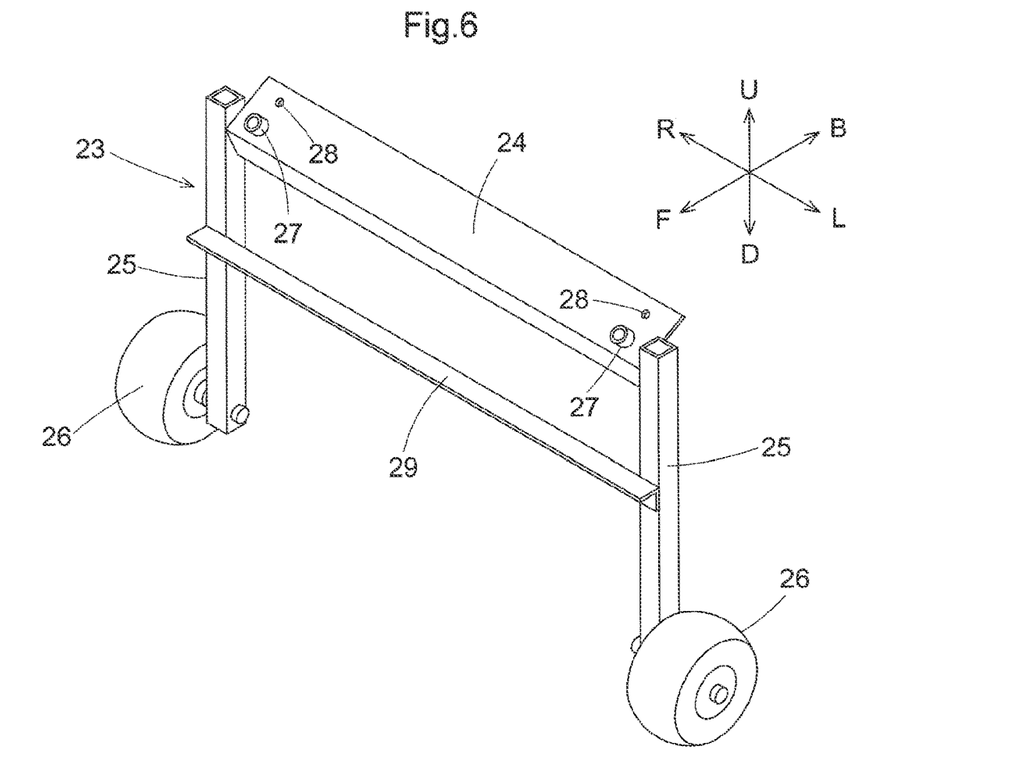
FIG. 6 is a perspective view of a movement assisting tool.
Figure 7:
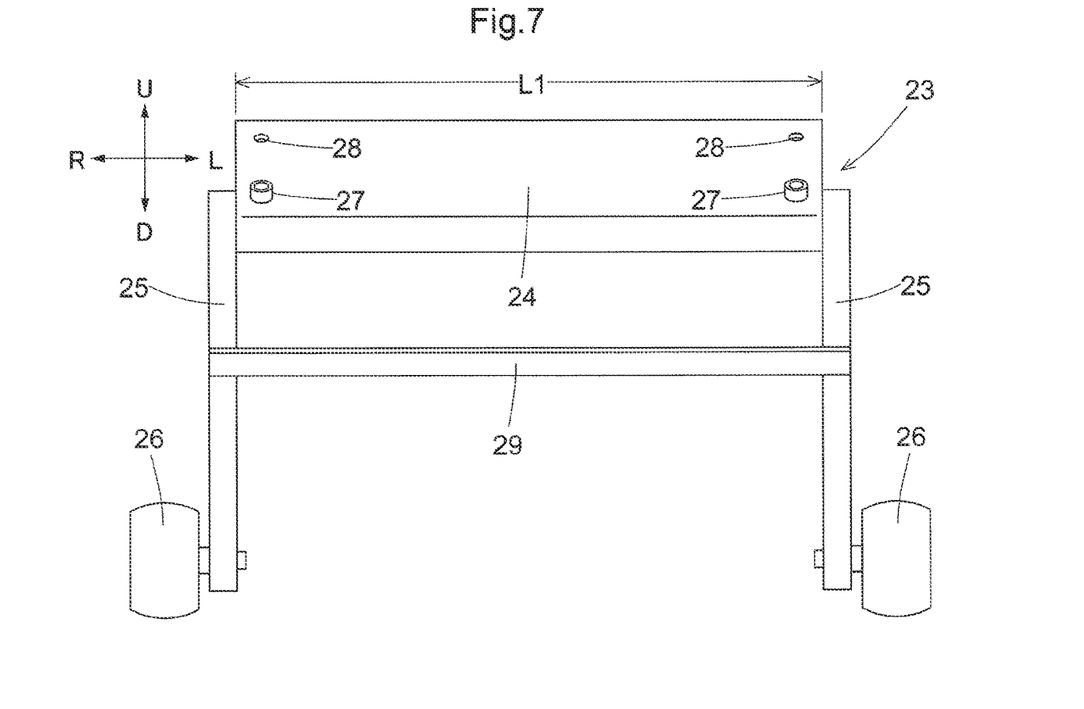
FIG. 7 is a front view of the movement assisting tool.
Figure 8:
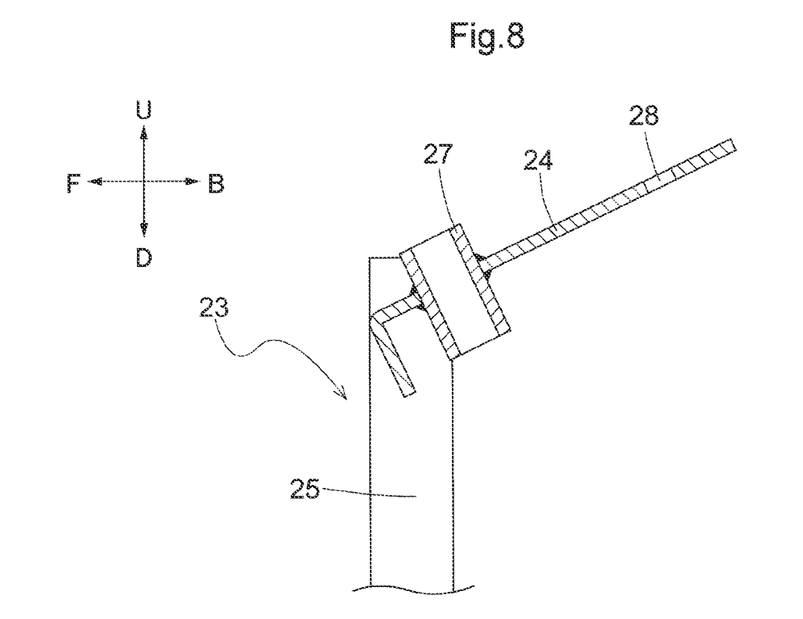
FIG. 8 is a vertical sectional left side view of a region including an attachment portion of the movement assisting tool.

As shown in FIGS. 6, 7 and 8, the movement assisting tool 23 has an attachment portion 24, leg portions 25, and moving wheels 26, and the configuration will be described in detail below.

The attachment portion 24 is configured by a plate member that has been bent into an angle shape, and has a predetermined length L1 along the width direction (left-right direction) of the main body portion 11 of the battery unit 4. The predetermined length L1 of the attachment portion 24 is the same as a length L2 (see FIG. 5) in the width direction (left-right direction) of the main body portion 11 of the battery unit 4.

Right and left boss portions 27 (corresponding to bottom attachment portions) are connected to right and left portions of the attachment portion 24. Right and left opening portions 28 (corresponding to the vertical wall attachment portions) are formed in right and left portions of the attachment portion 24. The boss portions 27 and the opening portions 28 face the same direction orthogonal to the upper surface of the attachment portion 24.

The leg portions 25 are constituted by rectangular pipes. The right and left leg portions 25 are coupled to one end portion and the other end portion, with respect to the direction along the predetermined length L1, of the attachment portion 24, and extend downward from the attachment portion 24.

The right and left moving wheels 26 are supported by outward portions of the extension portions of the leg portion 25. The moving wheels 26 can freely rotate around an axis that extends along the left-right direction.

An angled frame 29 is coupled to and extends between intermediate portions of the right and left leg portions 25 (corresponding to the state of the frame 29 that is coupled to and extends between the leg portions 25 that are coupled to one end portion and the other end portion, with respect to the direction along the predetermined length L1, of the attachment portion 24).

Attachment/removal of movement assisting tool to/from battery unit

When the movement assisting tool 23 is to be attached to the battery unit 4, the operator performs operations as described below.

Figure 9:
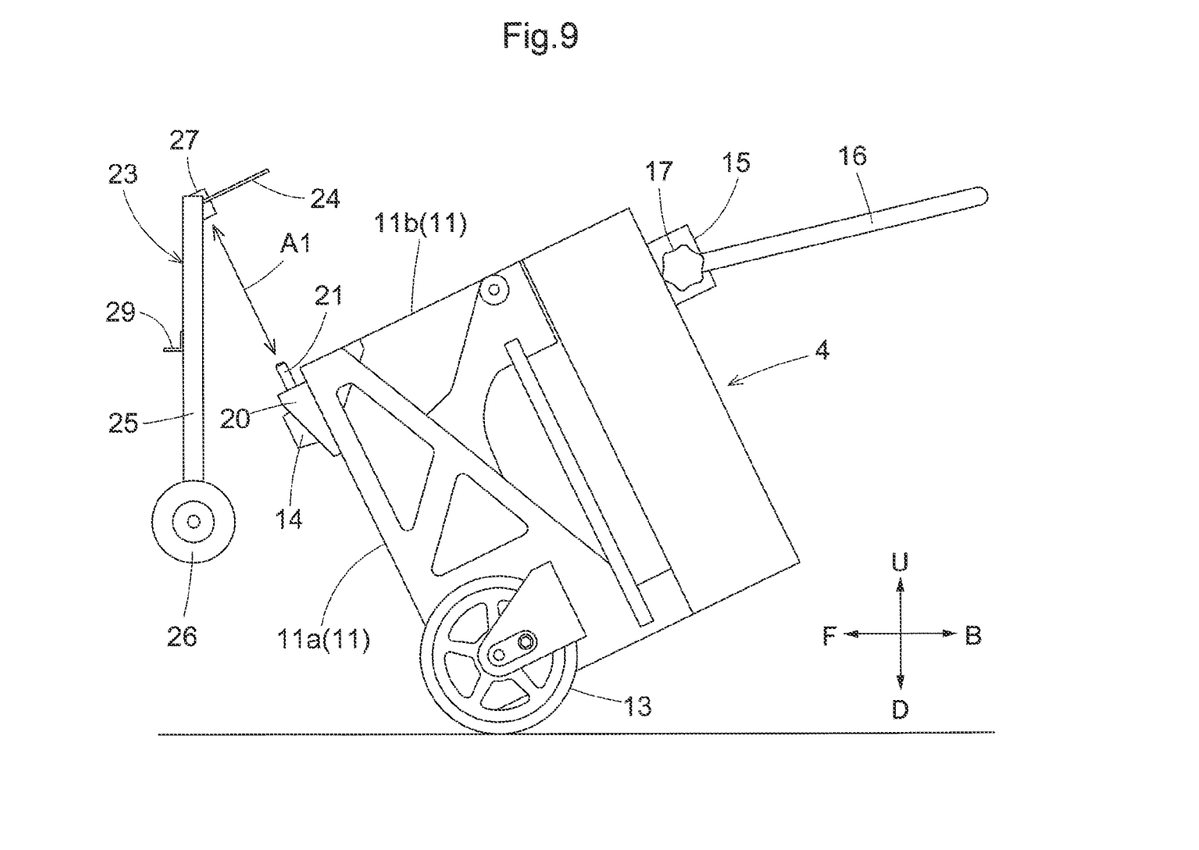
FIG. 9 is a left side view of a state where the movement assisting tool is attached to the battery unit.
Figure 10:
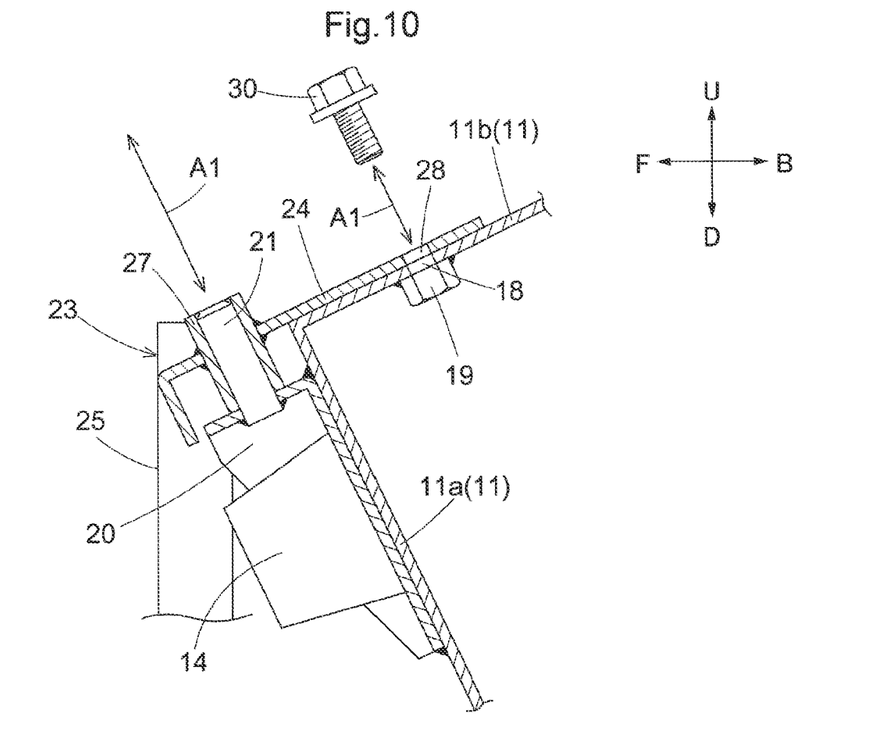
FIG. 10 is a vertical sectional left side view of a region including the attachment portion of the movement assisting tool in a state where the movement assisting tool has been attached to the battery unit.
Figure 11:
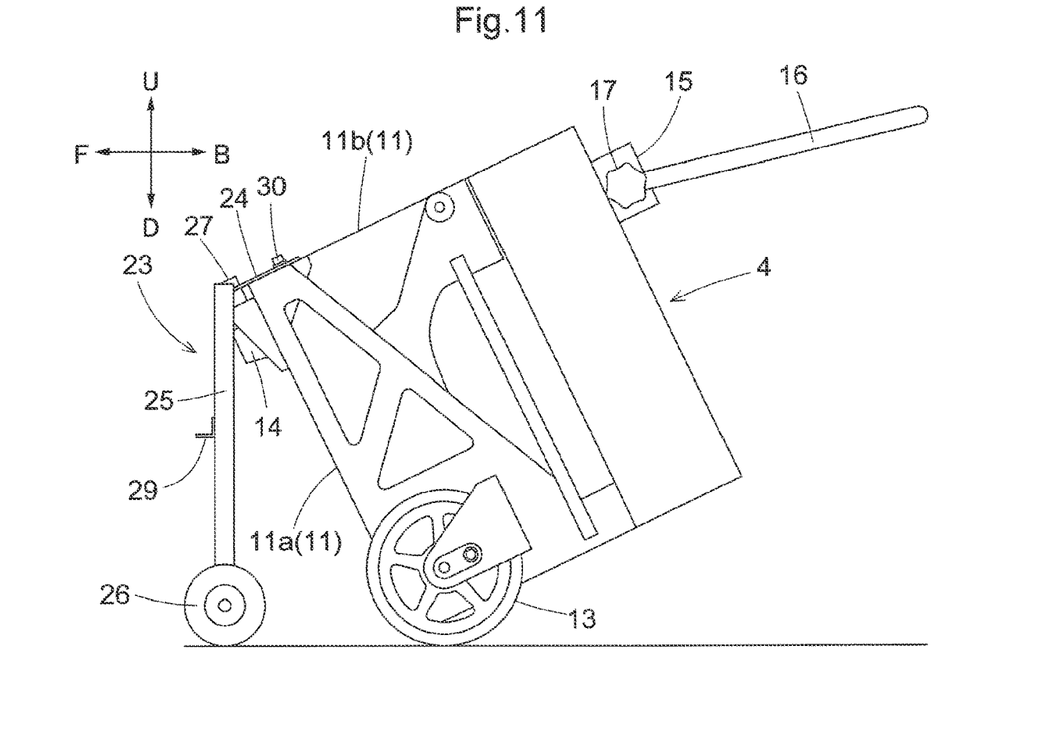
FIG. 11 is a left side view of a state where the movement assisting tool has been attached to the battery unit.

As shown in FIGS. 9, 10 and 11, the operator tilts the battery unit 4 such that the ground contact portions 14 of the battery unit 4 are raised above the ground and the wheels 13 of the battery unit 4 touch the ground, and maintains this state.

While keeping the leg portions 25 of the movement assisting tool 23 in an approximately vertical orientation, the operator moves the movement assisting tool 23 toward the battery unit 4 along the direction A1 that extends along the bottom portion 11a of the main body portion 11 of the battery unit 4. Then, the pins 21 of the battery unit 4 are inserted into the boss portions 27 of the movement assisting tool 23 along the direction A1, and the attachment portion 24 (opening portions 28) of the movement assisting tool 23 is abutted against the front wall portion 11b (opening portions 18) of the battery unit 4 (main body portion 11).

The operator then screws bolts 30 into the opening portions 28 of the movement assisting tool 23 as well as the opening portions 18 and the nuts 19 of the battery unit 4 along the direction A1 that extends along the bottom portion 11a of the main body portion 11 of the battery unit 4.

The operator attaches the movement assisting tool 23 to the battery unit 4 by performing the operations described above. As shown in FIG. 11, due to the attachment portion 24 of the movement assisting tool 23 being attached to the main body portion 11 of the battery unit 4, the battery unit 4 is maintained in an inclined orientation in which the moving wheels 26 of the movement assisting tool 23 touch the ground, the wheels 13 of the battery unit 4 touch the ground, and the ground contact portions 14 are raised above the ground.

As shown in FIGS. 10 and 11, the attachment portion 24 of the movement assisting tool 23 is attached to a portion of the main body portion 11 of the battery unit 4 that is located near the ground contact portions 14 (corresponding to the other portion of the lower portion of the main body portion 11 of the battery unit 4).

In the portion of the main body portion 11 of the battery unit 4 that is located near the ground contact portions 14, the attachment portion 24 of the movement assisting tool 23 is attached so as to span the bottom portion 11a of the main body portion 11 of the battery unit 4 and the front wall portion 11b of the main body portion 11 of the battery unit 4 (corresponding to the vertical wall portion that is connected to the bottom portion 11a of the main body portion 11 of the battery unit 4).

When the movement assisting tool 23 is to be removed from the battery unit 4 by the operator, as shown in FIGS. 9, 10, and 11, the operator removes the bolts 30 from the opening portions 28 of the movement assisting tool 23 as well as the opening portions 18 and the nuts 19 of the battery unit 4 along the direction A1 that extends along the bottom portion 11a of the main body portion 11 of the battery unit 4.

Next, while keeping the leg portions 25 of the movement assisting tool 23 in an approximately vertical orientation, the operator separates the boss portions 27 of the movement assisting tool 23 from the pins 21 of the battery unit 4 along the direction A1 that extends along the bottom portion 11a of the main body portion 11 of the battery unit 4. Also, the attachment portion 24 (opening portions 28) of the movement assisting tool 23 is separated from the front wall portion 11b (opening portions 18) of the battery unit 4 (main body portion 11) along the direction A1.

Connection of Battery Unit to Riding Mower and Pushing/Pulling of Battery Unit by Riding Mower.

Figure 14:
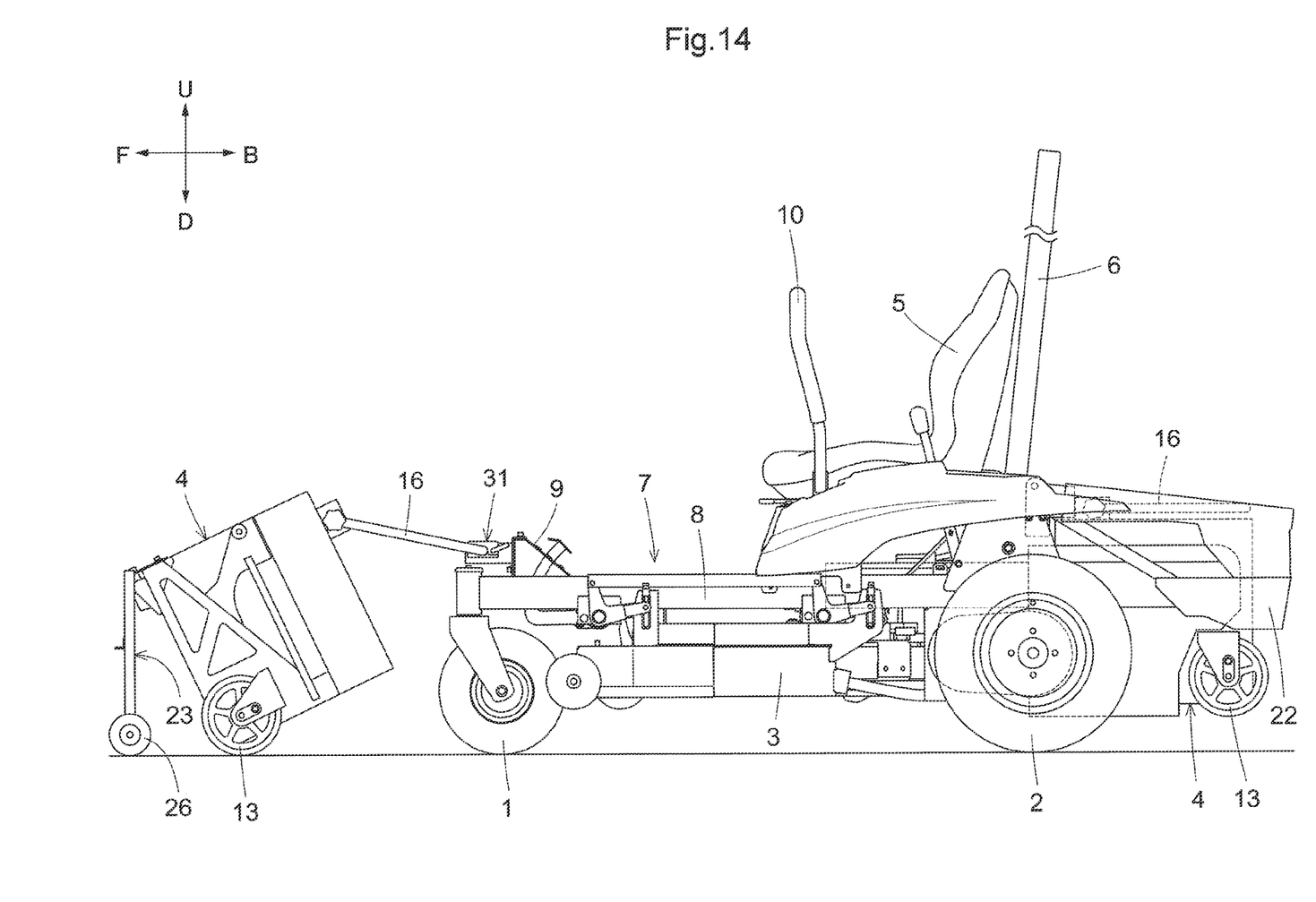
FIG. 14 is a left side view of a state where the battery unit with the movement assisting tool attached thereto has been connected to the riding mower.

As shown in FIG. 14, a connector 31 for connecting the battery unit 4 to the riding mower is coupled to a front portion of the floor 9 of the riding mower. The connector 31 is configured as described below.

Figure 12:
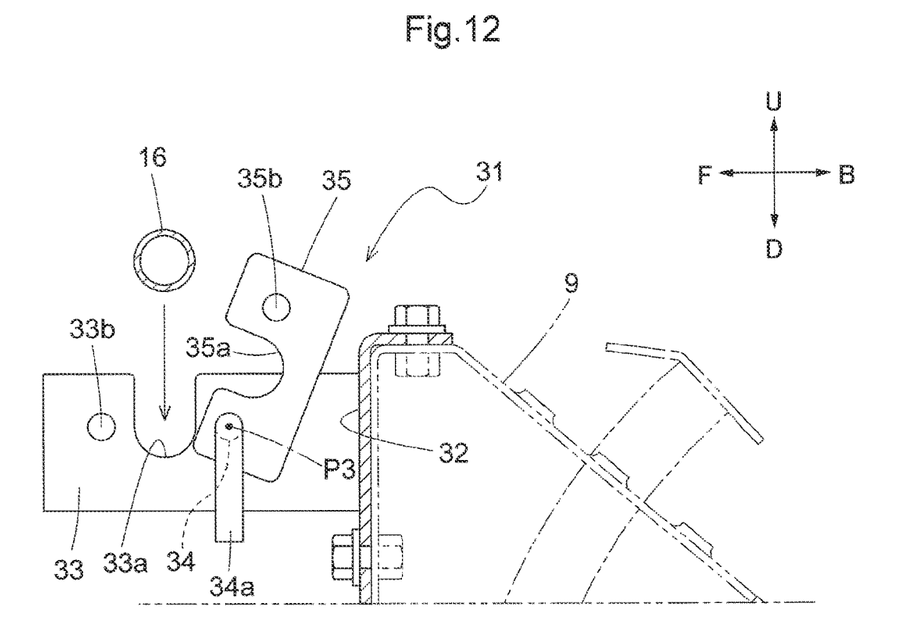
FIG. 12 is a vertical sectional left side view of a region including a connector.
Figure 13:
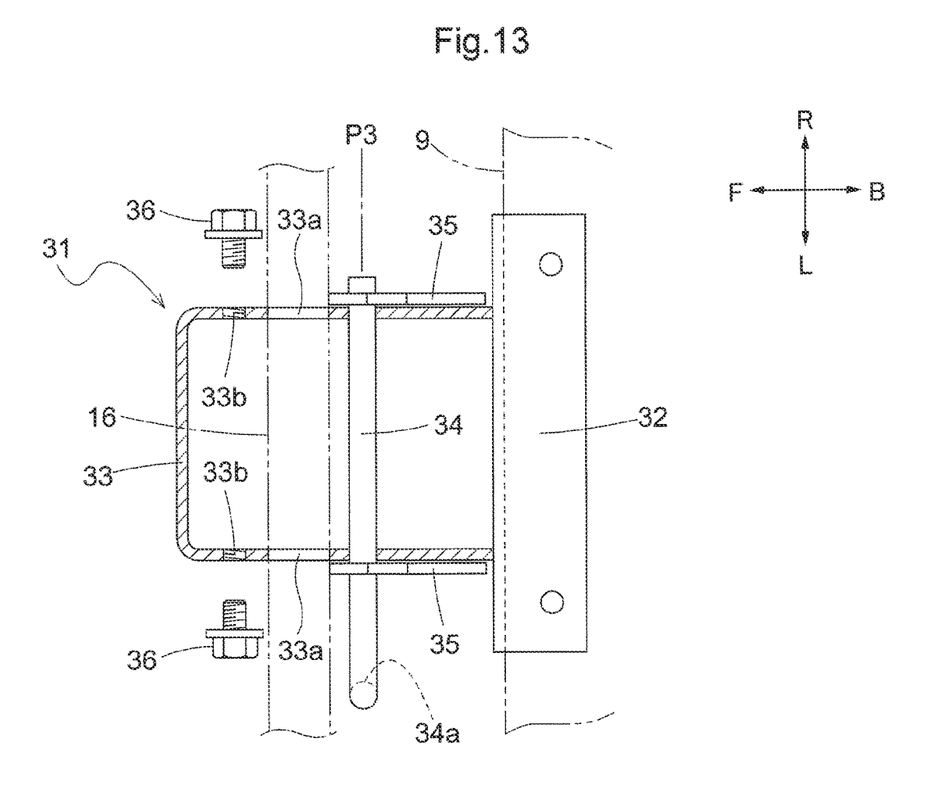
FIG. 13 is a plan view of a region including the connector.

As shown in FIGS. 12 and 13, a main body portion 33, which is bent in a channel shape in a plan view, is coupled to an angled substrate portion 32. U-shaped notch portions 33a and opening portions 33b are formed in right and left portions of the main body portion 33. Female threading is formed on the inner surfaces of the opening portions 33b.

An operation rod 34 is supported between right and left portions of the main body portion 33 so as to be able to rotate around an axis P3 that extends along the left-right direction. One end portion of the operation rod 34 is bent to form a handle portion 34a.

Right and left attachment portions 35 are coupled to portions of the operation rod 34 that are on the outer side of the main body portion 33. A U-shaped notch portion 35a and an opening portion 35b are formed in each of the attachment portions 35.

The connector 31 is configured as described above. Also, the substrate portion 32 of the connector 31 is bolted to a front portion of the floor 9 of the riding mower.

As shown in FIG. 14, while the movement assisting tool 23 is attached to the battery unit 4, the operator operates the fixture 17 of the battery unit 4 such that the operation handle 16 of the battery unit 4 can freely swing up and down.

As shown in FIGS. 12 and 13, the operator inserts the operation handle 16 of the battery unit 4 into the notch portions 33a of the connector 31 (main body portion 33), grabs the handle portion 34a of the operation rod 34, rotates the operation rod 34 and the attachment portions 35, and inserts the operation handle 16 of the battery unit 4 into the notch portions 35a of the attachment portions 35. The attachment portions 35 of the connector 31 are then coupled to the main body portion 33 by screwing bolts 36 into the opening portions 33b of the main body portion 33 of the connector 31 and the opening portions 35b of the attachment portions 35.

Accordingly, the battery unit 4 is connected to the riding mower.

As shown in FIG. 14, when the riding mower travels forward, the battery unit 4 is pushed via the connector 31 and the operation handle 16 of the battery unit 4 so as to travel forward together with the riding mower. When the riding mower travels backward, the battery unit 4 is pulled via the connector 31 and the operation handle 16 of the battery unit 4 so as to travel backward together with the riding mower.

First Variation of Invention

Figure 15:
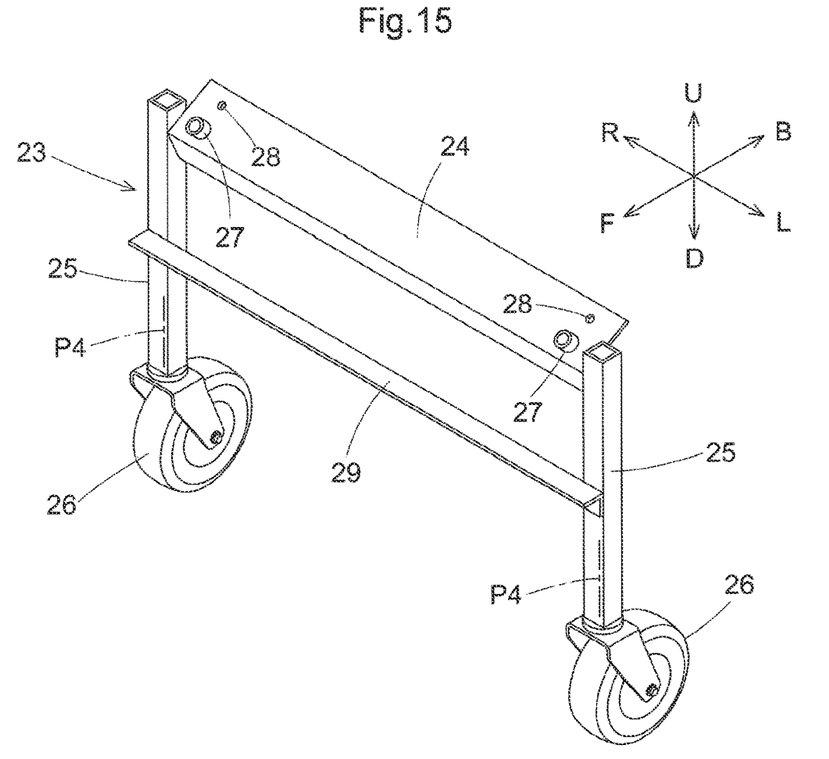
FIG. 15 is a perspective view of the movement assisting tool in a first variation of the invention.

As shown in FIG. 15, the moving wheels 26 of the movement assisting tool 23 may be configured as caster wheels that can freely change direction around an axis P4 that extends along the vertical direction (leg portions 25).

Second Variation of Invention

The battery unit 4 and the movement assisting tool 23 may be configured as described below.

Figure 16:
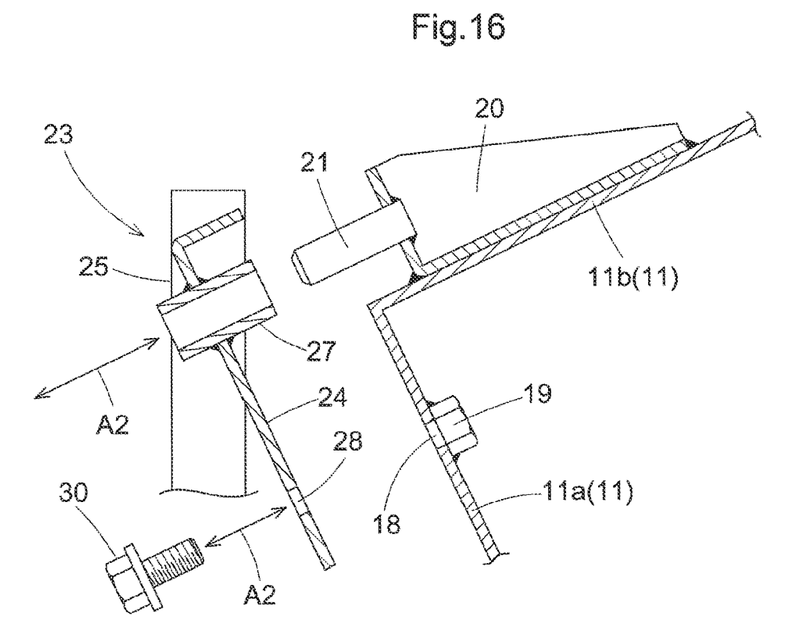
FIG. 16 is a vertical sectional left side view of a region including the attachment portion of the movement assisting tool in a state where the movement assisting tool is attached to the battery unit in a second variation of the invention.

As shown in FIG. 16, in the battery unit 4, the right and left opening portions 18 are formed extending in the vertical direction in the right and left portions of the front portion of the bottom portion 11a of the main body portion 11. The nuts 19 are coupled to the inner surface of the bottom portion 11a of the main body portion 11. The right and left brackets 20 are connected to right and left portions of the lower portion of the front wall portion 11b of the main body portion 11. The right and left pins 21 are coupled protruding downward from the brackets 20. As a result, the opening portions 18 and the pins 21 face the same direction A2 along the front wall portion 11b of the main body portion 11 of the battery unit 4.

In the movement assisting tool 23, the attachment portion 24 is flipped upside-down and coupled to the leg portions 25 at a different angle.

With the above configuration, while keeping the leg portions 25 of the movement assisting tool 23 in an approximately vertical orientation, the operator moves the movement assisting tool 23 toward the battery unit 4 along the direction A2 that extends along the front wall portion 11b of the main body portion 11 of the battery unit 4. Then, the pins 21 of the battery unit 4 are inserted into the boss portions 27 of the movement assisting tool 23 along the direction A2, and the attachment portion 24 (opening portions 28) of the movement assisting tool 23 is abutted against the bottom portion 11a (opening portions 18) of the battery unit 4 (main body portion 11).

The operator then screws the bolts 30 into the opening portions 28 of the movement assisting tool 23 as well as the opening portions 18 and the nuts 19 of the battery unit 4 along the direction A2 that extends along the front wall portion 11b of the main body portion 11 of the battery unit 4.

Third Variation of Invention

In the configuration shown in FIGS. 6 to 10, the pins 21 may be provided on the attachment portion 24 of the movement assisting tool 23, and the boss portions 27 may be provided on the brackets 20 of the battery unit 4.

According to this configuration, the pins 21 serve as bottom attachment portions.

In the configuration shown in FIG. 16, the pins 21 may be provided on the attachment portion 24 of the movement assisting tool 23, and the boss portions 27 may be provided on the brackets 20 of the battery unit 4.

According to this configuration, the pins 21 serve as vertical wall attachment portions.

Fourth Variation of Invention

In the configuration shown in FIGS. 6 to 10, the pins 21 may be provided on the front wall portion 11b of the main body portion 11 of the battery unit 4, the opening portions 18 and the nuts 19 may be provided on the brackets 20 of the bottom portion 11a of the main body portion 11 of the battery unit 4, the boss portions 27 may be provided on an upper portion of the attachment portion 24 of the movement assisting tool 23, and the opening portions 28 may be provided in a lower portion of the attachment portion 24 of the movement assisting tool 23.

According to this configuration, the boss portions 27 serve as vertical wall attachment portions, and the opening portions 28 serve as bottom attachment portions.

The operator moves the movement assisting tool 23 toward the battery unit 4 along the direction A1 that extends along the bottom portion 11a of the main body portion 11 of the battery unit 4.

The boss portions 27 of the movement assisting tool 23 are mounted to the pins 21 of the battery unit 4, and the attachment portion 24 (opening portions 28) of the movement assisting tool 23 is abutted against the brackets 20 (opening portions 18) of the bottom portion 11a of the battery unit 4 (main body portion 11).

The bolts 30 are then screwed into the opening portions 28 of the movement assisting tool 23 as well as the opening portions 18 and the nuts 19 of the battery unit 4 along the direction A1 that extends along the bottom portion 11a of the main body portion 11 of the battery unit 4.

In the above configuration, the boss portions 27 may be provided on the front wall portion 11b of the main body portion 11 of the battery unit 4, and the pins 21 may be provided on the upper portion of the attachment portion 24 of the movement assisting tool 23.

According to this configuration, the pins 21 serve as vertical wall attachment portions.

Fifth Variation of Invention

In the configuration shown in FIG. 16, the pins 21 may be provided on the bottom portion 11a of the main body portion 11 of the battery unit 4, the opening portions 18 and the nuts 19 may be provided on the brackets 20 of the front wall portion 11b of the main body portion 11 of the battery unit 4, the boss portions 27 may be provided on a lower portion of the attachment portion 24 of the movement assisting tool 23, and the opening portions 28 may be provided in an upper portion of the attachment portion 24 of the movement assisting tool 23.

According to this configuration, the boss portions 27 serve as bottom attachment portions, and the opening portions 28 serve as vertical wall attachment portions.

The operator moves the movement assisting tool 23 toward the battery unit 4 along the direction A2 that extends along the front wall portion 11b of the main body portion 11 of the battery unit 4.

The boss portions 27 of the movement assisting tool 23 are mounted to the pins 21 of the battery unit 4, and the attachment portion 24 (opening portions 28) of the movement assisting tool 23 is abutted against the brackets 20 (opening portions 18) of the bottom portion 11a of the battery unit 4 (main body portion 11).

The bolts 30 are then screwed into the opening portions 28 of the movement assisting tool 23 as well as the opening portions 18 and the nuts 19 of the battery unit 4 along the direction A2 that extends along the front wall portion 11b of the main body portion 11 of the battery unit 4.

In the above configuration, the boss portions 27 may be provided on the bottom portion 11a of the main body portion 11 of the battery unit 4, and the pins 21 may be provided on the lower portion of the attachment portion 24 of the movement assisting tool 23.

According to this configuration, the pins 21 serve as bottom attachment portions.

Sixth Variation of Invention

The pins 21 and the boss portions 27 may be omitted from the battery unit 4 and the movement assisting tool 23.

According to this configuration, the opening portions 18 and the nuts 19 are provided on both the bottom portion 11a and the front wall portion 11b of the main body portion 11 of the battery unit 4, and the opening portions 28 are provided at two locations facing the opening portions 18 in the attachment portion 24 of the movement assisting tool 23.

Accordingly, the operator abuts the attachment portion 24 (opening portions 28) of the movement assisting tool 23 against the bottom portion 11a and the front wall portion 11b of the main body portion 11 of the battery unit 4, and screws the bolts 30 into the opening portions 28 of the movement assisting tool 23 as well as the opening portions 18 and the nuts 19 of the battery unit 4 along the direction A1 that extends along the bottom portion 11a of the main body portion 11 of the battery unit 4 and the direction A2 that extends along the front wall portion 11b.

Seventh variation of invention

The attachment portion 24 of the movement assisting tool 23 may be configured to be attached to and removed from the bottom portion 11a of the main body portion 11 of the battery unit 4 in a portion of the main body portion 11 of the battery unit 4 that is located near the ground contact portions 14, rather than being attached to the front wall portion 11b of the main body portion 11 of the battery unit 4.

The attachment portion 24 of the movement assisting tool 23 may be configured to be attached to and removed from the front wall portion 11b of the main body portion 11 of the battery unit 4 in a portion of the main body portion 11 of the battery unit 4 that is located near the ground contact portions 14, rather than being attached to the bottom portion 11a of the main body portion 11 of the battery unit 4.

Eighth Variation of Invention

In the movement assisting tool 23, the predetermined length L1 of the attachment portion 24 may be slightly longer or slightly shorter than the length L2 in the width direction (left-right direction) of the main body portion 11 of the battery unit 4.

The leg portions 25 may be coupled to intermediate portions of the attachment portion 24 within the range of the predetermined length L1 rather than being coupled to one end portion and the other end portion of the attachment portion 24. Three or more leg portions 25 may be coupled to the attachment portion 24.

Ninth variation of invention

In the battery unit 4, the wheels 13 may be supported by a front portion of the bottom portion 11a of the main body portion 11, and the ground contact portions 14 may be coupled to a rear portion of the bottom portion 11a of the main body portion 11.

According to this configuration, the movement assisting tool 23 is attached to the rear portion of the lower portion of the battery unit 4, and the rear wall portion 11d of the main body portion 11 of the battery unit 4 serves as a vertical wall portion that is connected to the bottom portion 11a of the main body portion 11 of the battery unit 4.

Tenth Variation of Invention

In the riding mower, the connector 31 may be configured to be coupled to the rear portion (cover body 22) of the machine body 7.

According to this configuration, when the riding mower travels forward, the battery unit 4 is pulled via the connector 31 and the operation handle 16 of the battery unit 4 so as to travel forward together with the riding mower. When the riding mower travels backward, the battery unit 4 is pushed via the connector 31 and the operation handle 16 of the battery unit 4 so as to travel backward together with the riding mower.

INDUSTRIAL APPLICABILITY

The present invention can be applied not only to a movement assisting tool for attachment to a battery unit mounted as a power source in an electric riding mower, but also to a movement assisting tool for attachment to a battery unit mounted in another electric work vehicle.

What is claimed is:
1. A movement assisting tool for attachment to a battery unit comprising a main body portion that accommodates a battery, a wheel provided in one portion of a lower portion of the main body portion, and a ground contact portion provided in another portion of the lower portion of the main body portion, the movement assisting tool comprising:
   an attachment portion that can be attached to and removed from the main body portion;
   a leg portion that is coupled to the attachment portion and extends from the attachment portion; and
   a moving wheel supported by an extension portion of the leg portion,
   wherein, in a state where the attachment portion is attached to the main body portion and the moving wheel is touching the ground, the battery unit is in an inclined orientation in which the wheel is touching the ground and the ground contact portion is raised above the ground,
   wherein the attachment portion can be attached to and removed from the other portion of the lower portion of the main body portion,
   wherein in the other portion of the lower portion of the main body portion, the attachment portion can be attached so as to span a bottom portion of the main body portion and a vertical wall portion of the main body portion that is connected to the bottom portion, wherein the attachment portion comprises a bottom attachment portion that can be attached to and removed from the bottom portion of the main body portion, and a vertical wall attachment portion that can be attached to and removed from the vertical wall portion of the main body portion, wherein the bottom attachment portion and the vertical wall attachment portion can be attached and removed in the same direction extending along the bottom portion of the main body portion or the same direction extending along the vertical wall portion of the main body portion, and wherein:

one of the bottom attachment portion and the vertical wall attachment portion is an opening portion formed in the attachment portion, another one of the bottom attachment portion and the vertical wall attachment portion is a pin or a boss portion that is coupled to the attachment portion, one of the bottom attachment portion and the vertical wall attachment portion is attached to the main body portion by a bolt being inserted into the opening portion and screwed to the main body portion, and the other of the bottom attachment portion and the vertical wall attachment portion is attached to the main body portion by the pin or the boss portion being inserted into a boss portion or a pin of the main body portion.

2. The movement assisting tool according to claim 1, wherein the attachment portion has a predetermined length along a width direction of the main body portion, and wherein two leg portions are respectively coupled to and extend from one end portion and another end portion, with respect to a direction along the predetermined length, of the attachment portion.

3. The movement assisting tool according to claim 2, wherein the predetermined length is the same as the length of the main body portion in the width direction.

4. The movement assisting tool according to claim 2, further comprising:

a frame coupled to and extending between the leg portions that are respectively coupled to the one end portion and the other end portion, with respect to the direction along the predetermined length, of the attachment portion.

5. The movement assisting tool according to claim 1, wherein the moving wheel is a caster wheel that can freely change direction about an axis that extends in a vertical direction.

6. A movement assisting tool for attachment to a battery unit comprising a main body portion that accommodates a battery, a wheel provided in one portion of a lower portion of the main body portion, and a ground contact portion provided in another portion of the lower portion of the main body portion, the movement assisting tool comprising:

an attachment portion that can be attached to and removed from the main body portion, the attachment portion comprising:

a boss portion configured to receive a pin extending from the main body portion therein; and an opening portion configured to be attached to the main body portion by a bolt;

a leg portion that is coupled to the attachment portion and extends from the attachment portion; and a moving wheel supported by an extension portion of the leg portion, wherein, in a state where the attachment portion is attached to the main body portion and the moving wheel is touching the ground, the battery unit is in an inclined orientation in which the wheel is touching the ground and the ground contact portion is raised above the ground.

7. The movement assisting tool according to claim 6, wherein the attachment portion has a predetermined length along a width direction of the main body portion, and two leg portions are respectively coupled to and extend from one end portion and another end portion, with respect to a direction along the predetermined length, of the attachment portion.

8. The movement assisting tool according to claim 7, wherein the predetermined length is the same as the length of the main body portion in the width direction.

9. The movement assisting tool according to claim 7, further comprising:

a frame coupled to and extending between the leg portions that are respectively coupled to the one end portion and the other end portion, with respect to the direction along the predetermined length, of the attachment portion.

10. The movement assisting tool according to claim 6, wherein the attachment portion can be attached to and removed from the other portion of the lower portion of the main body portion.

11. The movement assisting tool according to claim 10, wherein in the other portion of the lower portion of the main body portion, the attachment portion can be attached so as to span a bottom portion of the main body portion and a vertical wall portion of the main body portion that is connected to the bottom portion.

12. The movement assisting tool according to claim 11, wherein the attachment portion comprises a bottom attachment portion that can be attached to and removed from the bottom portion of the main body portion, and a vertical wall attachment portion that can be attached to and removed from the vertical wall portion of the main body portion, and the bottom attachment portion and the vertical wall attachment portion can be attached and removed in the same direction extending along the bottom portion of the main body portion or the same direction extending along the vertical wall portion of the main body portion.

13. The movement assisting tool according to claim 12, wherein:

one of the bottom attachment portion and the vertical wall attachment portion is the opening portion formed in the attachment portion, another one of the bottom attachment portion and the vertical wall attachment portion is the boss portion that is coupled to the attachment portion, one of the bottom attachment portion and the vertical wall attachment portion is attached to the main body portion by the bolt being inserted into the opening portion and screwed to the main body portion, and the other of the bottom attachment portion and the vertical wall attachment portion is attached to the main body portion by the boss portion receiving the pin of the main body portion.

14. The movement assisting tool according to claim 6, wherein the moving wheel is a caster wheel that can freely change direction about an axis that extends in a vertical direction.

15. A movement assisting tool for attachment to a battery unit comprising a main body portion that accommodates a battery, a wheel provided in one portion of a lower portion of the main body portion, and a ground contact portion provided in another portion of the lower portion of the main body portion, the movement assisting tool comprising:
- an attachment portion that can be attached to and removed from the main body portion;
- a leg portion that is coupled to the attachment portion and extends from the attachment portion; and
- a moving wheel supported by an extension portion of the leg portion,
- wherein, in a state where the attachment portion is attached to the main body portion and the moving wheel is touching the ground, the battery unit is in an inclined orientation in which the wheel is touching the ground and the ground contact portion is raised above the ground,
- the attachment portion has a predetermined length along a width direction of the main body portion,
- two leg portions are respectively coupled to and extend from one end portion and another end portion, with respect to a direction along the predetermined length, of the attachment portion,
- an upper end portion of each of the leg portions is coupled to the corresponding end portion of the attachment portion, and
- each of the moving wheels is held by a lower end portion of the corresponding leg portion.

16. The movement assisting tool according to claim 15, wherein the predetermined length is the same as the length of the main body portion in the width direction.

17. The movement assisting tool according to claim 15, further comprising:
- a frame coupled to and extending between the leg portions that are respectively coupled to the one end portion and the other end portion, with respect to the direction along the predetermined length, of the attachment portion.

18. The movement assisting tool according to claim 15, wherein the attachment portion can be attached to and removed from the other portion of the lower portion of the main body portion.

19. The movement assisting tool according to claim 18, wherein in the other portion of the lower portion of the main body portion, the attachment portion can be attached so as to span a bottom portion of the main body portion and a vertical wall portion of the main body portion that is connected to the bottom portion.

20. The movement assisting tool according to claim 19, wherein the attachment portion comprises a bottom attachment portion that can be attached to and removed from the bottom portion of the main body portion, and a vertical wall attachment portion that can be attached to and removed from the vertical wall portion of the main body portion, and
wherein the bottom attachment portion and the vertical wall attachment portion can be attached and removed in the same direction extending along the bottom portion of the main body portion or the same direction extending along the vertical wall portion of the main body portion.

21. The movement assisting tool according to claim 20, wherein:
- one of the bottom attachment portion and the vertical wall attachment portion is an opening portion formed in the attachment portion,
- another one of the bottom attachment portion and the vertical wall attachment portion is a pin or a boss portion that is coupled to the attachment portion,
- one of the bottom attachment portion and the vertical wall attachment portion is attached to the main body portion by a bolt being inserted into the opening portion and screwed to the main body portion, and
- the other of the bottom attachment portion and the vertical wall attachment portion is attached to the main body portion by the pin or the boss portion being inserted into a boss portion or a pin of the main body portion.

22. The movement assisting tool according to claim 15, wherein the moving wheel is a caster wheel that can freely change direction about an axis that extends in a vertical direction.

* * * * *